United States Patent Office 2,927,106
Patented Mar. 1, 1960

2,927,106

PRODUCTION OF SOLID POLYMER

Harold J. Hepp and E. O. Box, Jr., Bartlesville, Okla., assignors to Phillips Petroleum Company, a corporation of Delaware No Drawing. Application February 25, 1957
Serial No. 641,866

5 Claims. (Cl. 260—94.9)

This invention relates to the production of solid polymeric materials. In one aspect, the invention relates to a process for polymerizing ethylene in the presence of a catalyst which is novel for this purpose. In another aspect the invention relates to new polymers. In another aspect, the invention relates to the production of catalysts.

The polymers produced according to this invention are thermoplastic, normally solid materials. They are useful for those applications known for polyethylenes in general such as the production of molded articles such as containers for liquids. The polymers can be extruded to form rods, pipes, tubes, or sheets. They can also be fabricated into films (by rolling, inflating or extruding) which are useful for the packaging of foods, drugs, and other articles and materials. The polymers can be added to other polymers such as natural and synthetic rubber, polystyrene, and polyethylenes made by other methods in order to impart desired properties to these materials.

According to this invention, ethylene is polymerized to form solid polymer by contacting with a catalyst comprising zinc oxide associated with silica and alumina.

The catalyst for the process generally contains a minor proportion of zinc oxide, and the zinc oxide content is ordinarily in the range from about 1 to about 10 weight percent, based on the total weight of catalyst. The material with which the zinc oxide is associated is preferably a silica-alumina compositie of the type generally utilized as a catalyst in the prior art of catalytic cracking. This composite can be produced by any of the methods known in the prior art, e.g. coprecipitation, deposition of silica on alumina, or vice versa, or by the acid treatment of certain naturally occurring silicates such as clays. A highly satisfactory material is a coprecipitated gel comprising a major proportion of silica and a minor proportion of alumina. However, the alumina can be the major component in the composite. Generally, it is preferred to use a silica-alumina composite which contains from 0.5 to about 20 weight percent of alumina, the remainder being silica. A large variety of silica-alumina gel composites of this general type is available on the market and well known to those skilled in the art. The zinc oxide can be associated with the silica-alumina in any desired manner. For example, the silica alumina composite can be milled in a ball mill together with granular solid zinc oxide. Alternatively, the zinc oxide can be coprecipitated with the silica-alumina composite. A method which has been found highly satisfactory for the preparation of catalyst according to this invention comprises depositing a zinc compound calcinable to zinc oxide (e.g. zinc nitrate, zinc acetate, zinc carbonate, zinc hydroxide, or the zinc citrates) on a preformed silica-alumina composite and subsequently heating the resulting composite. In one embodiment, the catalyst can be prepared by impregnating the silica-alumina composite with an aqueous solution of a zinc salt calcinable to zinc oxide, draining off excess liquid, drying the resulting compounds, e.g. at temperatures in the range 200 to 350° F., and subsequently heating the dried composite, preferably under nonreducing conditions. The heating step following the drying can be conducted at a temperature in the range from about 350 to about 1500° F. and is preferably conducted in a vacuum or in a nonreducing atmosphere such as nitrogen, helium, argon, carbon dioxide, oxygen or air. Hydrogen, carbon monoxide, or other reducing gases can be present, but if these are present the temperature and time should be limited so that reduction of all of the zinc oxide is not obtained. It is generally preferred that the heating step be conducted in the presence of an oxidizing gas such as oxygen or air and that the atmosphere be substantially dry, i.e. that it have a dew point below about 0° F. A preferred range of activation temperatures is from about 600 to about 1300° F. The time of heating is regulated to obtain a substantial increase in the activity of the catalyst. Ordinarily, the time of heating is in the range from a few minutes to 50 hours or longer. Time and temperature of heating are intimately related so that shorter times are effective at higher temperatures and longer times are required at lower temperatures. In most cases, the time of heating is in the range from about 1 to about 10 hours.

The polymerization is generally conducted at a temperature below about 500° F. Ordinarily, the polymerization is conducted at a temperature from about 100 to about 500° F. and preferably from about 200 to about 400° F.

The pressure maintained during the polymerization step can range from about atmospheric to 1000 p.s.i. or higher. Ordinarily the pressure range is from about 100 to about 700 p.s.i. The ethylene can be present in the reaction zone in the gaseous phase with or without a diluent or solvent. In many cases it is desirable to use a diluent which is liquid and inert under the conditions of polymerization, the pressure being maintained at a sufficiently high value to maintain the diluent substantially in the liquid phase. The reactor can be operated liquid-full, all of the ethylene being dissolved in the diluent. It is often preferable, however, to maintain a gas phase comprising chiefly ethylene in contact with the liquid in the reactor. This type of operation facilitates efficient reaction and maintenance of a steady supply and concentration of ethylene in the reactor. It also facilitates pressure and concentration control.

The diluent or solvent used can be any material which is inert and nondeleterious under the reaction conditions. Preferably, the diluent is a hydrocarbon and more preferably it is a hydrocarbon selected from the group consisting of paraffinic and cycloparaffinic hydrocarbons. However, aromatic hydrocarbons can be used if desired. Specific diluents which can be used are methane, ethane, propane, normal butane, isobutane, normal pentane, isopentane, normal hexane, the isohexanes, normal heptane, the isoheptanes, normal octane, and the isooctanes, e.g. 2,2,4-trimethylpentane. The nonanes, the decanes, the undecanes, and the dodecanes are also useful. Other suitable diluents are cyclopentane, methylcyclopentanes, the dimethylcyclopentanes, cyclohexane, methylcyclohexane, and the dimethylcyclohexanes. When a paraffinic hydrocarbon is used, it is preferred that it contain from 3 to 12 carbon atoms per molecule since these paraffins can readily be liquefied under the reaction conditions. Under certain circumstances, the cycloparaffins are preferred diluents on account of their relatively high solvent power for the product polymers.

The technique of contacting the hydrocarbon feed with the catalyst can vary, depending upon the results desired. Fixed-bed contacting can be utilized, as can mobile catalyst techniques. Contacting with a fluidized or suspended catalyst, with the hydrocarbon feed in the liquid or gaseous phase is within the scope of the invention. Thus a satisfactory technique comprises suspending the catalyst (e.g. 20–70 mesh or finer) in the liquid diluent to form a slurry or suspension containing, for example from 0.1 to 30 weight percent of catalyst, feeding such a suspension or slurry to the reaction zone, simultaneously supplying a gaseous stream of ethylene, agitating the mixture of ethylene, diluent and catalyst within the reaction zone, withdrawing an effluent, heating the effluent to a temperature from 10 to 50° higher than that in the reaction zone in order to effect complete solution of the polymer in the solvent, filtering to remove catalyst, recovering a filtrate, and recovering the dissolved from the filtrate by vaporizing the solvent or diluent or by cooling the solution to precipitate the polymer and recovering the precipitated polymer. When fixed-bed contacting is used the space velocity is generally in the range from about 1 to about 20 liquid volume feed per volume of catalyst per hour. When a suspended catalyst technique is used, the residence time of the ethylene in the reaction zone is usually from about 15 minutes to about ten hours.

Methods of recovering the polymer can vary, depending upon the method of catalytic contacting utilized and upon the desired use to which the polymer is to be put. Thus, when fixed bed contacting is used, the effluent from the reaction zone can be processed for the production of light polymer and the contacting of feed with a given mass of catalyst can be interrupted from time to time to remove adhering polymer from the catalyst surface. This removal can be accomplished by the use of a hot solvent such as a hydrocarbon of the type already referred to as being suitable as diluents in the polymerization. This removal is ordinarily accomplished at a temperature above that used for the polymerization. The removed heavy polymer fraction can then be recovered from solution in the solvent. When a mobile catalyst is utilized, the effluent from the reaction zone contains catalyst. Whether the catalyst is to be removed depends upon, among other things, the intended use of the polymer. In some cases, the final polymer is used for purposes which do not preclude the presence of relatively small amounts of solid catalyst. In such cases, the complete removal of catalyst is unnecessary. When a polymer which contains no inorganic impurities is desired, removal of the catalyst is necessary. One method for removing the catalyst has already been described. Removal of polymer from admixture with solvent hydrocarbon can be accomplished by methods already known. Thus the solvent can be removed from admixture with the polymer by vaporization or the solution can be cooled to precipitate the polymer which can then be recovered by filtration or similar methods.

While the invention has been described chiefly in connection with the homopolymerization of ethylene to form solid polyethylene, minor amounts of other olefinic materials copolymerizable with ethylene can be present in the feed. Thus ethylene can be copolymerized with a relatively minor amount of propylene, 1-butene, 1-pentene, or 1,3-butadiene. Ordinarily the compound heavier than ethylene is present in minor amount, based on total olefin. Preferably, the heavier olefin is present in an amount from about 0.5 to about 20 weight percent, based on total olefin. Higher amounts tend to produce a polymer containing undesirably large amounts of liquid polymer.

*Example I*

A catalyst was prepared by treating 200 ml. of a dry, commercially available coprecipitated silica-alumina gel cracking catalyst (14 to 28 mesh; $SiO_2:Al_2O_3$ ratio, 9:1) for 30 minutes with an aqueous solution of zinc nitrate. The resulting mixture was filtered in a Buechner funnel, and the filter cake was dried in an oven at 110° C. The dried composite was heated at a temperature in the range 900 to 950° F. for about six hours in a stream of dry air. The catalyst contained approximately 5 weight percent zinc, in the form of zinc oxide. This zinc content was obtained empirically by adjustment of the concentration of the aqueous zinc nitrate solution.

The reactor used was fabricated from an 8-inch section of ½-inch pipe fitted with a metal screen in the lower end to support the catalyst bed. A thermocouple well extended along the axis of the pipe and contained two movable thermocouples. The reactor was heated by an electrical furnace.

Ethylene was contacted with pyrogallol to remove oxygen and was subsequently dried by contact with a silicate desiccant. The ethylene was mixed with dry, oxygen-free cyclohexane and passed through the reactor. The flow rates of ethylene entering and leaving the system were determined, as a basis for calculating ethylene conversion. Twenty-five ml. of the catalyst (14.2 grams) was present in the reactor during the run.

During the polymerization, the ethylene space velocity was 600 volumes of gaseous ethylene per volume of catalyst per hour. The space velocity of the cyclohexane diluent was 4 liquid volumes per volume of catalyst per hour. The reaction temperature was 380° F. The ethylene conversion was 15 percent per pass. The polymer formed was substantially completely solid, there being substantially no yield of butene or normally liquid polymer. The solid polymer can be molded to form containers for liquids, e.g. bottles or jars. It can be extruded to form pipe or tubing.

Silica-alumina, unpromoted with zinc oxide, and treated in substantially the same manner as the silica-alumina utilized in the catalyst preparation described, produced a much lower yield of solid polymer than that described above.

While certain compositions, examples, and process step have been described and certain process conditions have been given for purposes of illustration, it is clear that the invention is not limited thereto. Variation and modification are possible within the scope of the disclosure and claims.

We claim:

1. A process which comprises contacting ethylene at a temperature up to about 500° F. with a catalyst active for ethylene polymerization and consisting essentially of about 1 to about 10 weight percent of zinc oxide associated with silica and alumina wherein the alumina is present in the range of about 0.5 to about 20 weight percent of the silica and alumina to produce substantially a normally solid polymer of ethylene.

2. A process for polymerizing ethylene substantially completely to a solid polymer which comprises contacting ethylene, in admixture with a diluent which is liquid, inert, and nondeleterious under the reaction conditions, at a temperature in the range 200 to 400° F. and a pressure sufficient to maintain said diluent in the liquid phase, with a catalyst active for ethylene polymerization and consisting essentially of about 1 to about 10 weight percent of zinc oxide associated with a silica-alumina composite wherein the alumina is present in the range of about 0.5 to about 20 weight percent of the composite, and recovering a normally solid polymer of ethylene.

3. A process for polymerizing ethylene substantially to a solid polymer which comprises contacting ethylene, in admixture with a diluent selected from the group consisting of paraffins and cyclo-paraffins which are liquefiable under the polymerization conditions, at a temperature in the range 200 to 400° F. and a pressure sufficient to maintain said diluent substantially in the liquid phase, with a catalyst active for ethylene polymerization and consisting essentially of about 1 to about 10 weight percent of zinc oxide associated with a silica-alumina composite wherein the alumina is present in the range of about 0.5 to about 20 weight percent of said composite, and recovering a normally solid polymer of ethylene.

4. A process for polymerizing ethylene to a normally solid polymer which comprises contacting ethylene at a temperature up to about 500° F. with a catalyst prepared by impregnating a silica-alumina composite wherein the alumina is present in the range of about 0.5 to about 20 weight percent of said composite with an aqueous solution of a zinc compound calcinable to zinc oxide in an amount and a concentration sufficient to impregnate said composite with about 1 to about 10 weight percent of zinc oxide, drying the resulting composite, and heating in a nonreducing atmosphere and for a sufficient time to produce a substantial activation of said catalyst for said process, and recovering a normally solid polymer of ethylene.

5. A process for polymerizing ethylene to produce substantially a normally solid polymer of ethylene which comprises contacting ethylene at a temperature up to about 450° F. with a catalyst prepared by impregnating a silica-alumina composite wherein the alumina is present in the range of about 0.5 to about 20 weight percent of said composite with an aqueous solution of a zinc compound calcinable to zinc oxide in an amount and a concentration sufficient to impregnate said composite with about 1 to about 10 weight percent of zinc oxide, drying the resulting composite, and heating in a dry oxygen-containing atmosphere for a sufficient time to produce a substantial activation of said catalyst for said process, and recovering a normally solid polymer of ethylene.

References Cited in the file of this patent
UNITED STATES PATENTS

| | | |
|---|---|---|
| 2,129,732 | Fulton et al. | Sept. 13, 1938 |
| 2,242,321 | Pier et al. | May 20, 1941 |
| 2,281,919 | Connolly | May 5, 1942 |
| 2,342,856 | Hall | Feb. 29, 1944 |
| 2,355,388 | Michael et al. | Aug. 8, 1944 |
| 2,389,780 | Ipatieff et al. | Nov. 27, 1945 |
| 2,678,904 | Kearby et al. | May 18, 1954 |
| 2,825,721 | Hogan et al. | Mar. 4, 1958 |